United States Patent [19]

Frank

[11] Patent Number: 4,458,561

[45] Date of Patent: Jul. 10, 1984

[54] CONTROL SYSTEM AND METHOD FOR A POWER DELIVERY SYSTEM HAVING A CONTINUOUSLY VARIABLE RATIO TRANSMISSION

[76] Inventor: Andrew A. Frank, 1034 Hillside Ave., Madison, Wis. 53705

[21] Appl. No.: 380,921

[22] Filed: May 21, 1982

[51] Int. Cl.³ .......................................... B60K 41/12
[52] U.S. Cl. ...................................... 74/865; 74/863; 74/857; 74/877
[58] Field of Search ................. 74/857, 858, 865, 866, 74/877, 863, 752 D, 689; 474/17, 18, 28, 30

[56] References Cited

U.S. PATENT DOCUMENTS

| | | | |
|---|---|---|---|
| Re. 24,347 | 8/1957 | Miner | 74/230.17 |
| 2,059,591 | 11/1936 | Leoni | 74/857 X |
| 2,131,157 | 9/1938 | Almen et al. | 74/689 |
| 3,008,341 | 11/1961 | Cobb | 74/230.17 |
| 3,044,316 | 7/1962 | Forster | 74/865 |
| 3,256,747 | 6/1966 | Kempson | 74/865 |
| 3,368,426 | 2/1968 | Karig et al. | 74/865 |
| 3,552,232 | 1/1971 | Kress | 74/687 |
| 3,616,706 | 11/1971 | Shimamoto | 74/866 |
| 3,861,485 | 1/1975 | Busch | 74/869 X |
| 3,890,360 | 6/1975 | Pruvot et al. | 74/860 X |
| 4,008,567 | 2/1977 | Hirsch | 74/866 |
| 4,023,442 | 5/1977 | Woods et al. | 74/863 |
| 4,091,690 | 5/1978 | Miyao | 74/866 |
| 4,107,776 | 8/1978 | Beale | 74/865 |
| 4,152,947 | 5/1979 | Van Deursen et al. | 74/230.17 |
| 4,220,059 | 9/1980 | Mizuno et al. | 74/865 |
| 4,281,567 | 8/1981 | Maurer | 74/859 X |
| 4,346,625 | 9/1982 | Latsch et al. | 74/866 X |

FOREIGN PATENT DOCUMENTS

| | | | |
|---|---|---|---|
| 1182150 | 6/1959 | France | 74/866 |
| 1592060 | 7/1981 | United Kingdom | 474/18 |

OTHER PUBLICATIONS

Stubbs, "The Development of a Perbury Traction Transmission for Motor Car Applications" *American Society of Mechanical Engineers*, (1980).

Ironside et al., "Continuously Variable Transmission Control" *Vehicular Technology Society IEEE*, (1980).

Beachley et al., "Principles and Definitions for Continuously Variable Transmissions, with Emphasis on Automotive Applications" *American Society of Mechanical Engineers*, (1980).

"Porsche Features Engine and Driveline Efficiency" *Automotive Engineering*, vol. 90, No. 1, Jan. 1982, pp. 38–48.

Rayward et al., "Design Study of Torodial Traction CVT for Electric Vehicles" (1980).

Oliver et al., "Design Equations for a Speed and Torque Controlled Variable Ratio V-Belt Transmission" *Society of Automobile Engineers*, (1973).

*Primary Examiner*—Allan D. Herrmann
*Assistant Examiner*—D. Wright
*Attorney, Agent, or Firm*—Banner, Birch, McKie & Beckett

[57] ABSTRACT

A control system and method for a power delivery system, such as in an automotive vehicle, having an engine coupled to a continuously variable ratio transmission (CVT). Totally independent control of engine and transmission enable the engine to precisely follow a desired operating characteristic, such as the ideal operating line for minimum fuel consumption. CVT ratio is controlled as a function of commanded power or torque and measured load, while engine fuel requirements (e.g., throttle position) are strictly a function of measured engine speed. Fuel requirements are therefore precisely adjusted in accordance with the ideal characteristic for any load placed on the engine.

12 Claims, 4 Drawing Figures

CONTROL SYSTEM AND METHOD FOR A POWER DELIVERY SYSTEM HAVING A CONTINUOUSLY VARIABLE RATIO TRANSMISSION

The U.S. Government has rights in this invention pursuant to Contract No. W-7405-ENG-48 (Subcontract No. 4492309) awarded by the U.S. Department of Energy.

BACKGROUND OF THE INVENTION

This invention relates to a power delivery system having a continuously variable ratio transmission and, more particularly, to a control system and a control method for such a system, such as might be used in an automotive vehicle.

The quest for greater fuel economy of automotive vehicles has led to significant improvements in engine and transmission design and control. Continously variable ratio transmissions (CVT) have shown particular promise in this regard. It will be appreciated that at any given vehicle speed, and for any needed propulsive force, a certain transmission ratio will provide maximum fuel economy for a given engine. In addition, for any given vehicle speed, one transmission ratio will permit maximum acceleration with that engine. Since a CVT with the proper ratio range can provide any desired transmission ratio, it is obviously attractive for automobiles from the standpoint of economy, low emissions and performance. If the mechanical efficiency of the CVT is high and its ratio range is wide enough, it can even be possible to have both maximum economy and maximum performance in the same vehicle. Among the obvious benefits are fully automatic operation, smooth, stepless and rapid response to driver demand, and quieter cruising.

Many different CVT configurations have been developed in the prior art. These include, for example, hydrostatic transmissions; rolling contact traction drives; overrunning clutch designs; electrics; multi-speed gear boxes with slipping clutch; and V-belt traction drives. Of these the V-belt traction drives appear attractive for small to medium size passenger car applications because of their compactness, lightness and simplicity of design. Basically, this type of CVT comprises a V-belt which interconnects a driver sheave and driven sheave, the diameters of the sheaves being variable to change the ratio of the CVT. Recent advances in belt design have resulted in improved belt durability and longevity. If sheave movement can be properly controlled so as to avoid undue stresses on the belt, it is expected that a very long belt life can be achieved.

Many control schemes have been devised for engine-CVT systems in attempts to maximize fuel economy. These have been based on empirical analyses of individual engine performance, and the realization that, for any desired power output, there is an optimum combination of engine speed and torque which will result in minimum fuel consumption. This is illustrated in FIG. 1.

FIG. 1 is a typical performance map of a four cylinder spark ignition passenger car engine having a displacement of approximately 2.5 liters. The map is a plot of engine torque $T_E$ and brake horsepower BHP as a function of engine speed $N_E$. The dot-dash line near the top of the map is a plot of engine torque at full throttle. The series of curves in solid black lines are fuel consumption contours, indicating constant brake specific fuel consumption (BSFC) in lb.M/BHP-hr. Minimum fuel consumption occurs at a point designed by 0.4 pounds per horsepower-hour. The series of dashed lines indicates power output of the engine. The ideal operating line for low fuel consumption is indicated by the heavy solid line $f(N_E)$, this curve being a function of engine speed. The ideal operating line for low fuel consumption is purely a function of engine characteristics and is optimal regardless of vehicle road speed. Other ideal operating lines may appear on the performance map, for example, the ideal operating line for low emissions.

In a vehicle with a conventional, manually shifted gearbox, forward speed ratios usually are available in only four or five steps. The operating point of the engine on the performance map is determined by drive shaft speed, power or torque commanded, and transmission gear ratio. Since there are only a few gear ratios available in a typical transmission, the engine must be throttled much of the time. The engine must therefore operate most of the time at high BSFC values. In contrast, a CVT is able to vary its speed ratio continously to allow the engine to run at wider throttle and lower BSFC values.

Perhaps the most difficult task demanded of a control system for an engine-CVT system is to maintain engine operation along the ideal operating line. This is due to the almost continuous transient nature of operation of an automotive vehicle, there being hardly ever a time when road load and commanded torque or power remain constant. Transient conditions usually are dealt with by a change in CVT ratio, engine speed and throttle. Prior art control systems, by their very nature, permit an excursion of engine operation away from the ideal operating line before returning back to it at steady state. An example of such an excursion is shown in FIG. 1 as dashed line X-Y-Z. The result is that engine operation approaches, but hardly ever is maintained on the ideal operating line. Two such prior art systems are illustrated in FIGS. 2 and 3.

FIG. 2 schematically illustrates a system devised by Van Deursen and Ludoph for Van Doorne's Transmissie B.V. This system is described in greater detail in U.S. Pat. No. 4,152,947. In this system, engine speed and throttle position control the ratio of the CVT. The throttle is under the direct control of the vehicle accelerator pedal. The CVT disclosed in this patent is the V-belt traction type.

FIG. 3 is a schematic representation of the system devised by Miyao for Aisin Seiki. This system is described in greater detail in U.S. Pat. No. 4,091,690. Here, as in the Van Deursen system, engine throttle is primarily a function of commanded power or torque by direct connection with the accelerator pedal. The computer generates a ratio rate signal to change the CVT ratio as a function of measured throttle position, and engine torque and speed. Inherently sensed output torque also affects the CVT ratio.

In these, as well as in virtually all other engine-CVT control systems, throttle position is controlled directly by the vehicle accelerator pedal, or is a direct function of pedal position, as well as other parameters. Engine and transmission control usually are directly related to one another. Such control schemes permit engine operation during transients to vary from the ideal operating line. Excursions away from the ideal operating line result in less than optimum engine operation (e.g., excessive fuel consumption, or excessive emissions), until effective control is resumed by the system during steady state operation. As pointed out earlier, however, most vehicular operation is transient in nature, rather than steady state, so that substantially all engine operation occurs off the target operating line. Emissions calibrations must therefore be made in a substantial portion of the engine performance map. Most prior art control systems also must be specifically tailored to particular engines. This requires numerous specially designed control systems for a fleet of differently powered vehicles.

SUMMARY OF THE INVENTION

It is therefore an object of the present invention to overcome the above-noted disadvantages and deficiencies of the prior art providing an engine-CVT control scheme which substantially constantly maintains engine operation along the ideal operating line.

Another object of the invention is to provide such a control scheme in a vehicle whose characteristic will remain the same irrespective of the type of engine which is coupled to the CVT.

Another object of the invention is to greatly simplify calibration of the engine for emissions purposes.

Surprisingly it has been found that engine operation can readily be maintained along the ideal operating line by providing for totally independent engine and transmission control. That is, the position of the engine throttle is totally independent of accelerator pedal position. Throttle position and, hence, engine output torque simply is a function of engine speed only, and that function may be any desired relationship, for example, the ideal operating line for minimum fuel consumption, the ideal operating line for low emissions, or a compromise ideal operating line for low fuel consumption and low emissions. Torque or power commanded by the accelerator pedal controls CVT ratio, and engine speed is determined by the load placed thereon, which is a function of road load and CVT ratio. Hence, throttle position is precisely adjusted in accordance with the target function for any load placed on the engine.

For convenience, the invention is described throughout this specification in the contex of an engine-CVT propulsion system for an automotive vehicle. It is to be understood, however, that the principles of the invention are equally applicable to any type of power delivery system, including but not limited to other vehicular systems using internal or external combustion engines of any design, or to stationary power plants for driving compressors, generators or any other type of machinery. Where the term "throttle" is used, the term is understood to encompass any mechanism for controlling the delivery of fuel to the engine or other prime mover, be it a conventional carbureted spark-ignition engine wherein fuel flow varies with throttle butterfly position, a fuel injected spark-ignition or diesel engine, a gas turbine, and so on.

The above and other objects of the invention are accomplished by providing a method of controlling the operation of a prime mover having fuel delivery means for delivering a variable quantity of fuel thereto, the prime mover coupled to a continuously variable drive ratio transmission for delivering power from the prime mover to an output shaft. The drive ratio of the transmission varies as a function of required power or torque to thereby cause the speed of the prime mover to vary. The method comprises the steps of predetermining a fuel function defining desired fuel requirement for the prime mover in relation to prime mover operating speed, measuring the speed of the prime mover, and controlling the fuel delivery means only in accordance with the fuel function so that the fuel delivered to the prime mover is determined only by the speed thereof.

The invention also encompassses a system for carrying out the above-described method, the system comprising fuel function means defining a desired fuel requirement for the prime mover in relation to prime mover operating speed, speed measuring means for measuring the speed of the prime mover, and fuel control means operatively coupled to the fuel function means and the fuel delivery means for controlling the fuel delivery means only in accordance with the fuel requirement defined by the fuel function means, so that the fuel delivered to the prime mover is determined only by the speed thereof.

BRIEF DESCRIPTION OF THE DRAWINGS

The novel features of the invention are set with particularity in the appended claims, but the invention will be understood more fully and clearly from the following detailed description of the invention as set forth in the accompanying drawings, in which:

DETAILED DESCRIPTION

Figure 1:
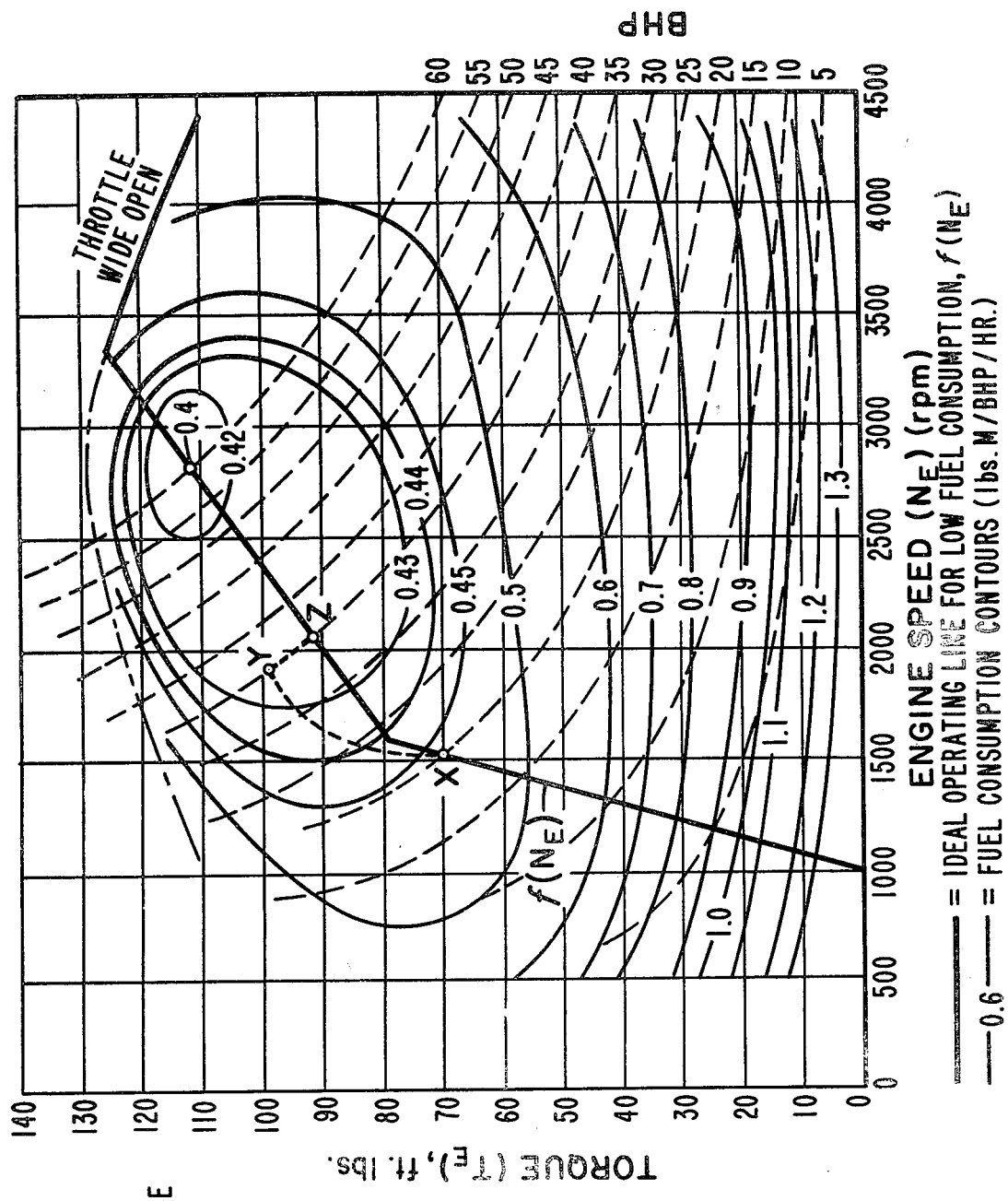
FIG. 1 is the performance map of a typical four cylinder passenger car engine having a displacement of approximately 2.5 liters.
Figure 2:
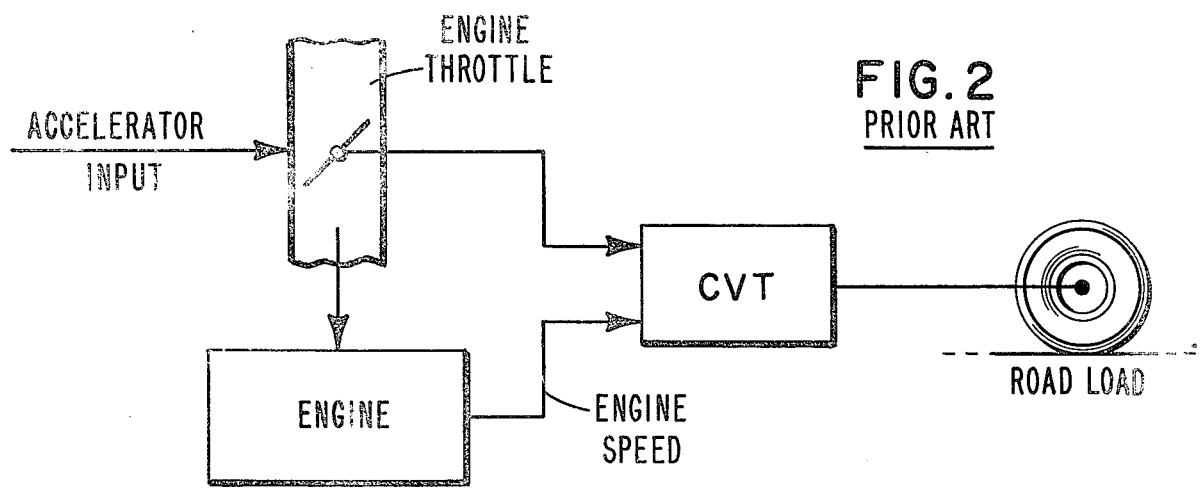
FIGS. 2 and 3 illustrate two forms of prior art engine-CVT control schemes.
Figure 3:
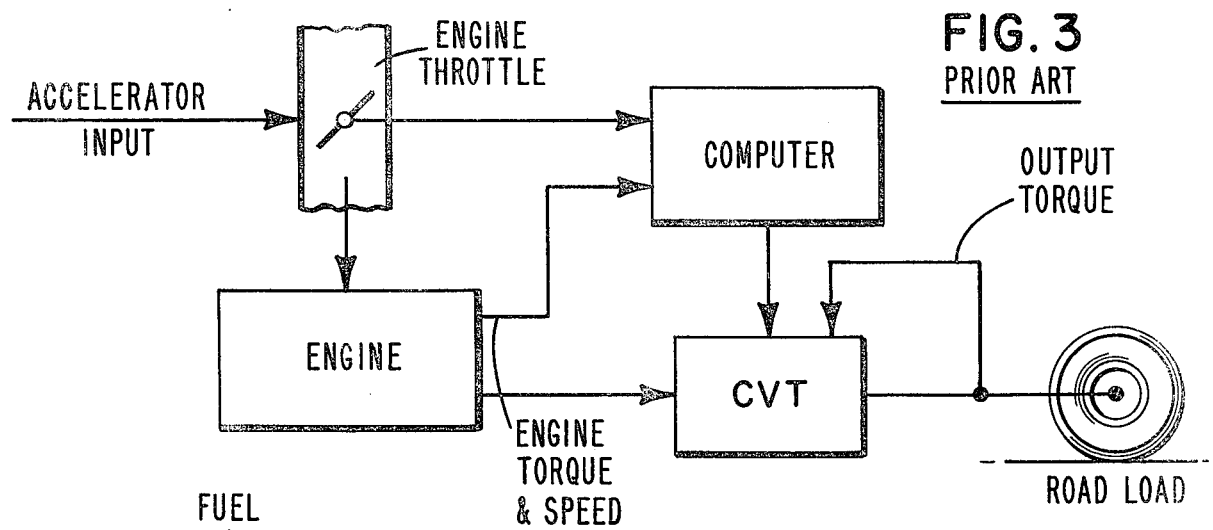
Figure 4:
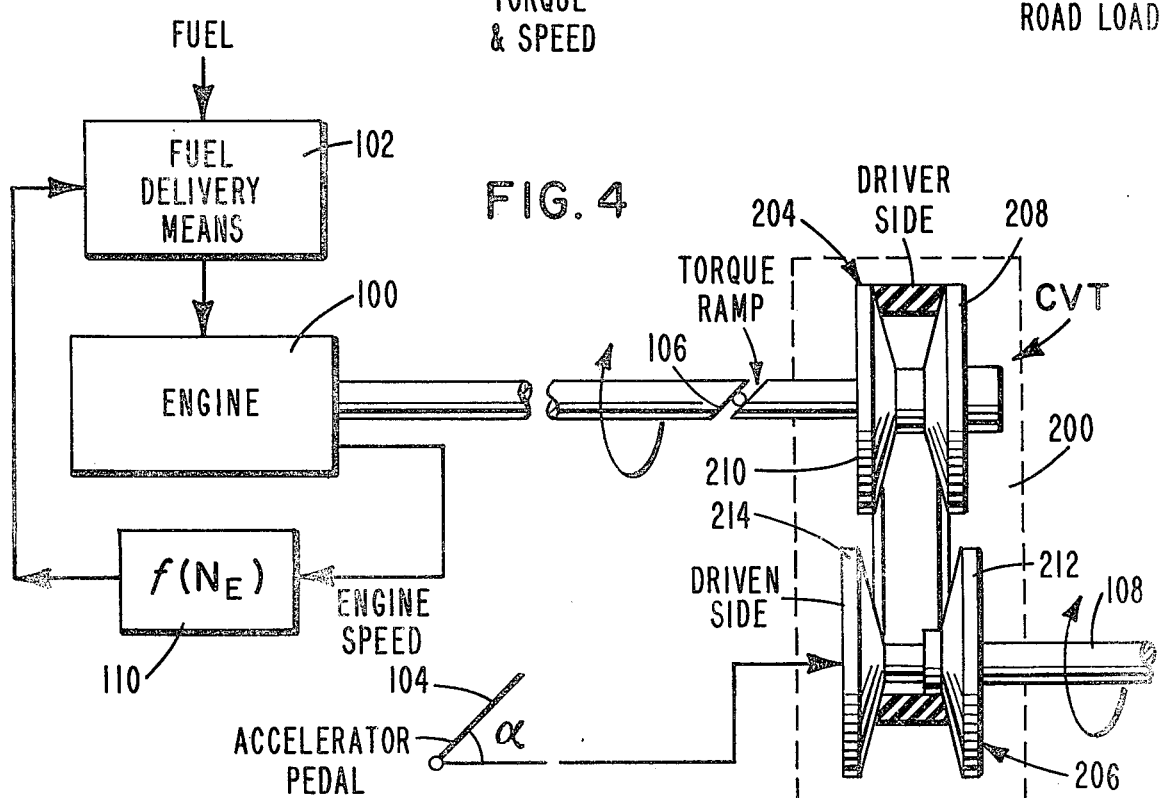
FIG. 4 is a schematic illustration showing the functional relationships of the components of an engine-CVT control scheme according to the invention.

Referring to FIG. 4, an engine 100 of an automotive vehicle is coupled to a continuously variable ratio transmission (CVT) 200 through a clutch or fluid coupling (not shown). Fuel is fed to engine 100 by a fuel delivery means 102, which may be the throttle and fuel jets of a conventional carburetor, a fuel injection system or the like. CVT 200 is illustrated as the V-belt traction drive type, having a V-belt 202 which drivingly engages a variable diameter driver sheave 204 and variable diameter driven sheave 206. Driver sheave 204 has an axially fixed portion 208 and axially movable portion 210. Axial movement of portion 210 toward or away from portion 208 will effect a change in driving diameter of driver sheave 204. Similarly, driven sheave 206 has an axially fixed portion 212 and an axially movable portion 214, axial movement of portion 214 effecting a change in driving ratio of driven sheave 206. An output shaft 108 delivers power and torque from the engine and CVT to the driving wheels of the vehicle.

The axial position of movable portion 214 of driven sheave 206 is determined by the position $\alpha$ of the vehicle accelerator pedal 104. The axial position of movable portion 210 of driver sheave 204 is determined by the difference between load torque, as seen by driver sheave 204, and engine output torque through a conventional spring-loaded torque ramp 106.

CVT ratio is, therefore, strictly a function of commanded power or torque ($\alpha$) as commanded by accelerator pedal 104, and load fed back through the CVT to torque ramp 106. Engine control, on the other hand, is independently provided by an engine controller 110 which adjusts fuel delivery means 102 only in accordance with measured engine speed $N_E$. This relationship may desirably be the ideal engine operating line for low fuel consumption, the ideal operating line for low emissions, a compromise of the two, or any other desired engine operating characteristic.

The above described control scheme quite simply and effectively accomplishes its primary objective of maintaining engine operation along an ideal operating line. A change of accelerator pedal position causes a change of ratio of the CVT. This causes a change in the load on the engine, which results in an engine speed change. Fuel delivery is then precisely adjusted in accordance with the ideal operating line to precisely match the fuel requirements of the engine for the load placed thereon. Transmission control requires only load and accelerator pedal position sensing, while engine control reqires only engine speed sensing. The control scheme can be accomplished by the use of electronic and/or mechanical components, it being understood that any type of control system which functions in the manner described may be used. It would appear that a control system incorporating many mechanical components would perhaps be the most reliable and least expensive alternative. Numerous other modifications of the invention will be apparent to those skilled in the art without departing from the the true spirit and scope of the invention which is defined by the appended claims.

I claim:

1. A method of controlling the operation of a prime mover having fuel delivery means for delivering a variable quantity of fuel thereto, said prime mover coupled to a continuously variable drive ratio transmission for delivering power from said prime mover to an output shaft, the drive ratio of said transmission varying as a function of required power or torque to thereby cause the speed of said prime mover to vary, the method comprising the steps of:
   determining a fuel function defining desired fuel requirement for said prime mover in relation to prime mover operating speed;
   measuring the speed of said prime mover; and
   controlling said fuel delivery means only in accordance with said fuel function so that the fuel delivered to said prime mover is determined only by the speed thereof.

2. The method of claim 1 wherein said fuel function is the prime mover ideal operating line for low fuel consumption.

3. The method of claim 1 wherein said prime mover is an internal combustion engine.

4. The method of claim 3 wherein said fuel delivery means comprises a throttle.

5. The method of claim 1 wherein said prime mover is the engine of an engine-driven vehicle.

6. The method of claim 5 wherein said fuel delivery means comprises a throttle.

7. A system for controlling the operation of a prime mover having fuel delivery means for delivering a variable quatity of fuel thereto, said prime mover coupled to a continuously variable drive ratio transmission for delivering power from said prime mover to an output shaft, the drive ratio of said transmission varying as a function of required power or torque to thereby cause the speed of said prime mover to vary, the system comprising:
   fuel function means defining a desired fuel requirement for said prime mover in relation to prime mover operating speed;
   speed measuring means for measuring the speed of said prime mover; and
   fuel control means operatively coupled to said fuel function means and said fuel delivery means for controlling said fuel delivery means only in accordance with the fuel requirement defined by said fuel function means, so that the fuel delivered to said prime mover is determined only by the speed thereof.

8. The system of claim 7 wherein said fuel function means defines the prime mover ideal operating line for low consumption.

9. The system of claim 7 wherein said prime mover is an internal combustion engine.

10. The system of claim 9 wherein said fuel delivery means comprises a throttle.

11. The system of claim 7 wherein said prime mover is the engine of an engine-driven vehicle.

12. The system of claim 11 wherein said fuel delivery means comprises a throttle.

* * * * *